United States Patent [19]
Calzi

[11] Patent Number: 5,727,169
[45] Date of Patent: *Mar. 10, 1998

[54] ELECTRONICALLY CONFIGURABLE CONNECTION DEVICE

[75] Inventor: Philippe Calzi, Bouc Bel Air, France

[73] Assignee: SGS-Thomson Microelectronics, S.A., Gentilly Cedex, France

[*] Notice: The term of this patent shall not extend beyond the expiration date of Pat. No. 5,434,982.

[21] Appl. No.: 172,474

[22] Filed: Dec. 27, 1993

Related U.S. Application Data

[63] Continuation of Ser. No. 714,197, Jun. 12, 1991, Pat. No. 5,434,982.

[30] Foreign Application Priority Data

Jun. 12, 1990 [FR] France .................. 90-07273

[51] Int. Cl.$^6$ ...................................... G06F 13/10
[52] U.S. Cl. ..................... 395/284; 395/829; 395/830
[58] Field of Search ........................ 395/725, 325, 395/425, 275, 284, 828, 829, 830, 728, 726, 700; 364/246.3, 247.2, 280.2, DIG. 1, 940.71, DIG. 2

[56] References Cited

U.S. PATENT DOCUMENTS

| | | | |
|---|---|---|---|
| 4,303,993 | 12/1981 | Panepinto, Jr. et al. | 365/230.03 |
| 4,373,181 | 2/1983 | Chisholm et al. | 395/400 |
| 4,556,953 | 12/1985 | Caprio et al. | 395/325 |
| 4,660,141 | 4/1987 | Ceccon et al. | 395/275 |
| 4,727,475 | 2/1988 | Kiremidjian | 395/325 |
| 4,775,931 | 10/1988 | Dickie et al. | 395/275 |
| 4,803,623 | 2/1989 | Klashka et al. | 395/275 |
| 4,860,256 | 8/1989 | Devin et al. | 365/189.03 |
| 4,897,569 | 1/1990 | Calzi | 307/530 |
| 4,964,038 | 10/1990 | Louis et al. | 395/275 |
| 5,038,320 | 8/1991 | Heath et al. | 395/275 |
| 5,042,003 | 8/1991 | Belt et al. | 395/425 |
| 5,247,682 | 9/1993 | Kondou et al. | 395/700 |
| 5,274,771 | 12/1993 | Hamilton et al. | 395/275 |

FOREIGN PATENT DOCUMENTS

| | | | |
|---|---|---|---|
| 0296022 | 12/1988 | European Pat. Off. | G08C 15/00 |
| 0 433 818 A2 | 12/1990 | European Pat. Off. | G06F 12/06 |
| 433 818 | 6/1991 | European Pat. Off. | G06F 12/06 |
| 296 022 | 12/1988 | France | G08C 15/00 |
| 87 08377 | 8/1989 | France | G11C 17/00 |

OTHER PUBLICATIONS

F. Chan et al., "A function Specific EP:D for the PS/2 Micro Channel Bus Adapter".

Proceedings of the IEEE 1989 Custom Integrated Circuits Conference.

K.J. Whiteley, "EPROM Decoder for Device Selection".

Electronic Engineering, vol. 58, No. 714, Jun. 1986, p. 36.

Data sheet for "DIP Switch Eliminator" parts (DS1223/DS1290/DS1292).

(from the 1988 data book of Dallas Semiconductor).

IEEE 1989, Custom Integrated Circuits Conference, San Diego, CA, pp. 5.2.1–5.2.4 (May 15–18, 1989(.

Datasheet for "DIP Switch Eliminator" parts (DS1223/DS1290/DS/1292) from the 1988 databook of Dallas Semiconductor).

Whiteley, "EPROM Decoder for Device Selection", Electronic Engineering, vol. 58, No. 714, p. 36 (Jun. 1986), London.

*Primary Examiner*—Glenn A. Auve
*Attorney, Agent, or Firm*—Robert Groover; Betty Formby

[57] ABSTRACT

The use of electromechanical devices for the configuration of the address for access to a peripheral unit in a data-processing system is avoided by replacing them with a non-volatile EEPROM-type memory. The data in non-volatile memory is read as soon as the peripheral unit is put into operation, and the information that it delivers is stored in volatile memory and used as a comparison address to validate the operation of the peripheral unit.

13 Claims, 2 Drawing Sheets

5,727,169

ELECTRONICALLY CONFIGURABLE CONNECTION DEVICE

This is a continuation of application Ser. No. 07/714,197, filed Jun. 12, 1991, now U.S. Pat. No. 5,434,982.

BACKGROUND OF THE INVENTION

1. Field of the Invention

An object of the present invention is an electronic connection device that can be used, in particular, to connect a peripheral unit to a central processing unit in a data-processing system.

2. Description of the Prior Art

There are known electronic connection devices which essentially include an arrangement of switches that can be activated by hand. For example there is one arrangement of switches which, used with a parallel type address bus, (i.e. a bus that comprises a certain number, e.g. eight, of conductive wires), has a switch in parallel with each of the conductive wires of the bus. These switches may have two positions: open or closed. An address, namely a logic state, is sent on the address bus. It is compared with the arrangement of switches. If this arrangement is configured in the same way as the address to be sent, the connection device produces a validation signal that permits the operation of the peripheral unit, under the control of the central processing unit, because this unit has been recognized as being the peripheral unit for which the instructions from this central processing unit are intended. In a computer system, for example with micro-computers, a peripheral unit such as this may be a printer, externally connected to the micro-computer, or it may be a unit internally connected to the micro-computer, for example a modem or a communications card with a display screen or with a digital optic disk reader.

Switches such as these are generally of the electromechanical type. They have drawbacks. Firstly, they have to be manipulated by hand, but their small size often makes them difficult to handle. Furthermore, to make it possible to reach them, it is necessary to make windows providing access to these microswitches in the rear or front faces of the machines containing electronic cards to which these microswitches are fixed. These access windows impose troublesome constraints on the manufacturing process. In other installations, the electronic cards containing these switches that play the role of access means to the peripherals are connected by their edges to a parent card. These cards are very close to one another. In this case, to make it possible to manipulate these switches, the electronic card bearing them has to be unplugged from the parent card after the electrical supply has been cut off, and then this electronic card has to be plugged in again after the manipulation. The connectors of the communications cards on the parent card are not easy to disconnect. They are not designed to be put under strain too often. Their reliability does not last beyond about a hundred operations of insertion and removal. Another drawback of this technique is that it also calls for the prior removal of the cover of the machine.

Moreover, the micro-switches themselves are mechanically fragile. First of all, they are very sensitive to vibrations: they are thus liable to change their state depending on shocks received. In this case, it is difficult for them to overcome validation constraints of a military type. In addition, the electromechanical nature of the contacts set up make them sensitive to dust and to the oxidation of the contacts, and entails a very complicated manufacturing technology. This manufacturing technology itself induces high implementation costs.

SUMMARY OF THE INVENTION

The object of the invention is to overcome the drawbacks of these electromechanical switches by replacing them with a non-volatile memory. In this case, an EEPROM-type memory is used, the memory cell of which possesses a transistor provided with a control gate and a floating gate interposed between this control gate and the conduction channel of the transistor. Beneath this floating gate, there may be stored charges that cause this transistor to be on or off, irrespective of the command applied to the control gate. In the invention, to then replace the microswitches by this memory, an automatic reading of this memory is triggered as soon as the peripheral unit in which this card is installed is put into operation. To avoid having to then read the EEPROM-type memory permanently, the contents of this memory are transferred to a register of flip-flop circuits which, for their part, may be read permanently. (One of the constraints to be coped with in bringing together as many electromechanical type switches as possible is that the logic state information which conditions the connection of the peripheral has to be made permanently available.)

The approach of the invention thus provides the additional possibility of enabling a remote programming of this connection circuit so as to change its address if need be.

Moreover, the cost and reliability of an EEPROM memory such as this cannot be compared with the cost and reliability of the arrangements of electromechanical switches. For, as shall be seen hereinafter, the number of logic circuits needed to fulfil this connection and address recognition function is very limited. In one example, with addresses encoded on eight bits, it is enough to have eight EEPROM type memory cells available. This makes for a total of about thirty transistors per connection circuit. In this way, it is possible to make up to four thousand circuits at a time in one manufactured batch of integrated circuits having a diameter of about 10 centimeters. The economy of scale is then such that the cost of such a circuit is in the range of a few cents.

An object of the invention, therefore, is an electronic connection device to connect a peripheral unit through a bus to a central processing unit, said device comprising a configuration element memorizing a logic state, said logic state being used to characterize the peripheral unit, said logic state acting as an address for access, from the central processing unit, to this peripheral unit, wherein the memory is an EEPROM type memory associated with an automatic starting-up protocol to read the characterizing logic state in this memory as soon as the voltage is turned on in the peripheral unit.

BRIEF DESCRIPTION OF THE DRAWINGS

The invention shall be understood more clearly from the following description and from the figures that accompany it. These figures are given purely by way of an indication and in no way restrict the scope of the invention. Of these figures.

DETAILED DESCRIPTION OF THE INVENTION

Figure 1:
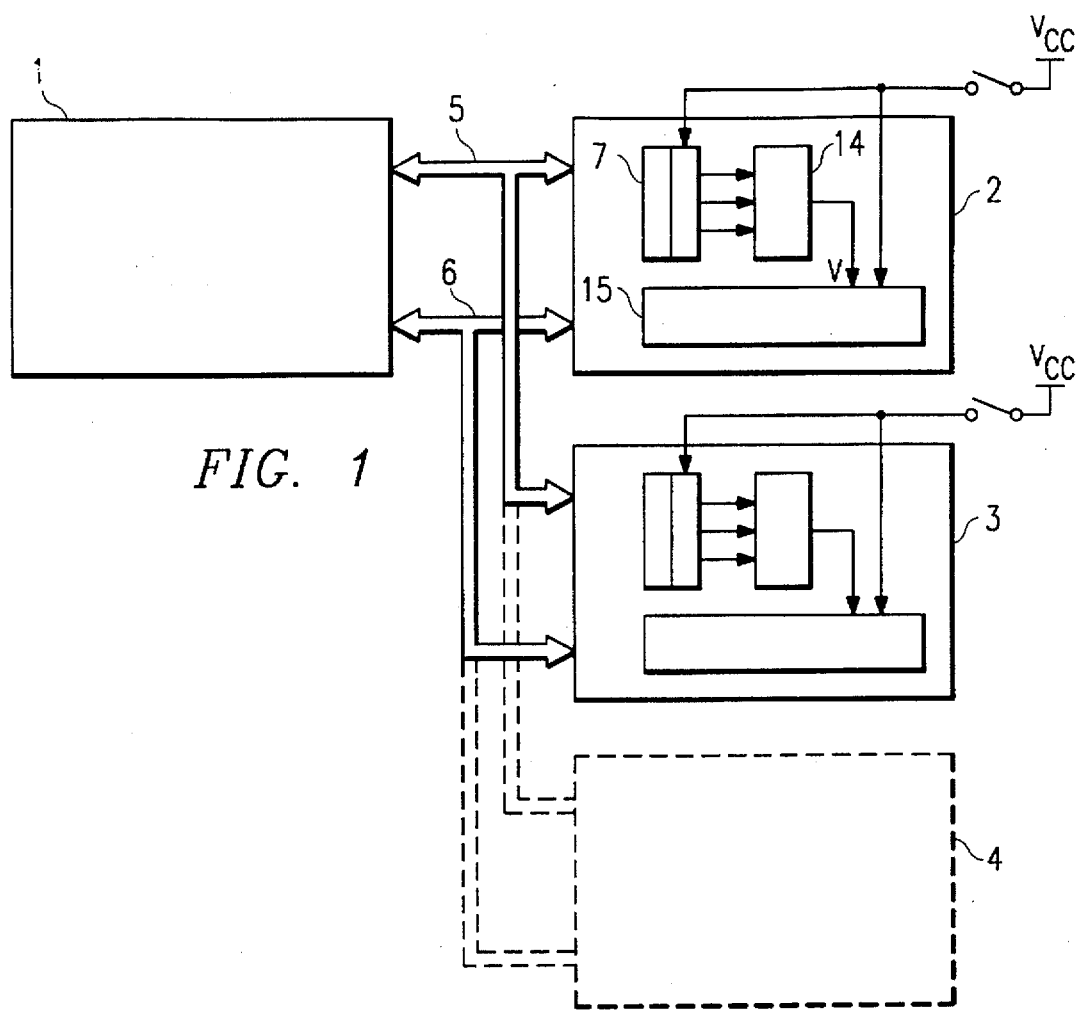
FIG. 1 shows an electronic connection device according to the invention.

FIG. 1 shows a connection device according to the invention. It has a central processing unit 1 designed to be in communication with the peripheral units such as 2, 3 or 4. The central processing unit 1 is connected to the peripheral units by an address bus 5 and a data bus 6. The buses 5 and 6 are shown herein as being different from each other. However it is possible for the information on addresses and the data to be conveyed by same conductors acting alternately as address buses and data buses according to a work and transfer protocol common to the central processing unit and the peripheral units. The peripheral units may be physically contained in one and the same pack as the central processing unit 1. In one application, it may be assumed that the central processing unit is a microcomputer provided with a keyboard and display screen while the peripheral unit 2 is a printer, the peripheral unit 3 is a digital optic disk reader etc.

Each peripheral unit has a configuration element 7 memorizing a logic state. In the prior art, the configuration element is formed by a network of switches in series, with resistors, between the supply Vcc of the system and the ground. When a switch is closed, the midpoint between this switch and the resistor delivers a logic state 0. When the switch is open, the midpoint between this switch and the resistor delivers a logic state 1 (Vcc).

Figure 2:
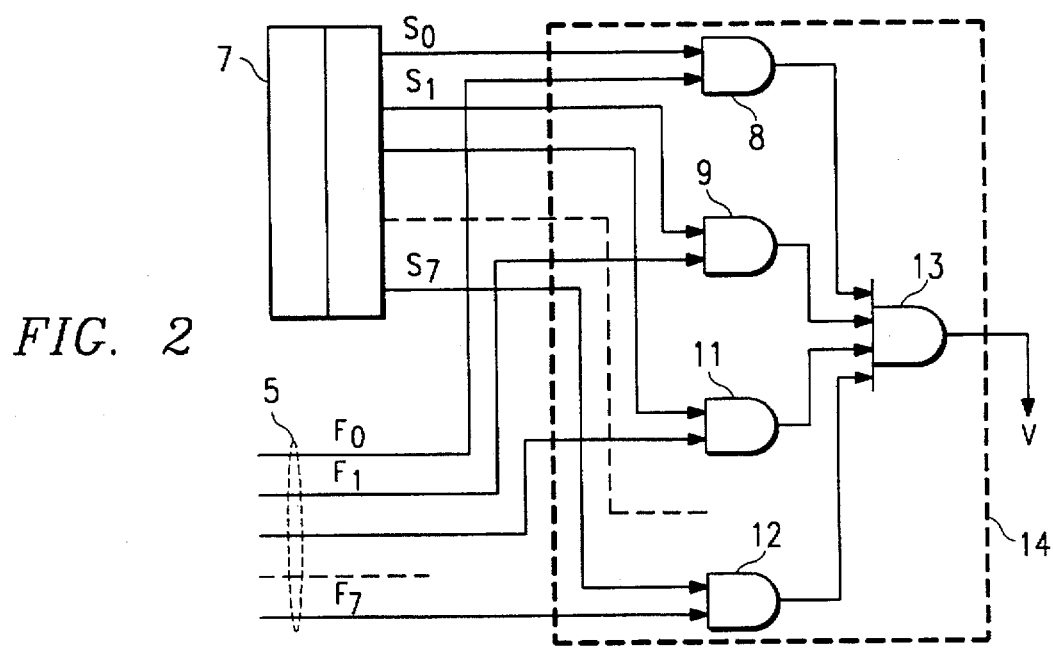
FIG. 2 shows a detail of an address decoding circuit enabling the validation of the working of the peripheral unit.

This logic state is used to validate the access, from the peripheral unit, to the central processing unit. FIG. 2 shows, for example, how this validation can take place according to the invention. The configuration element 7 delivers, for example at its outputs $S_O$ to $S_7$, the logic states 1 or 0 depending on what was contained in memory in the circuit 7. An address corresponding to logic states imposed is then sent by the address bus 5 on eight conductive wires $F_0$ to $F_7$. These logic states are applied, in correspondence respectively with the outputs $S_0$ to $S_7$ of the configuration circuit 7, respectively to the inputs of a group of AND gates 8 to 12. When there is an exact correspondence between the address available on the wires $S_0$ to $S_7$ and the signal memorized in the configuration circuit 7, the AND gates 8 to 12 each deliver a logic state 1. The AND gates 8 to 12 are connected by their outputs to the inputs of a common AND gate 13. When there is agreement, the gate 13 delivers a validation signal V.

The signal V is used to put the peripheral unit 2 into operation. This putting into operation corresponds to a recognition that the commands that will be sent by the data bus 6 are now effectively commands intended for this peripheral unit 2 and not for another one, for example the unit 3 or the unit 4. The set of gates 8 to 13, acting as a comparison or validation circuit, is contained in a circuit 14. The peripheral unit itself has utilization circuits 15. These circuits 15 are clearly also connected to the address bus and the data bus 6. The circuit 14 may be an integral part of the circuit 7 or of the circuit 15.

Figure 3:
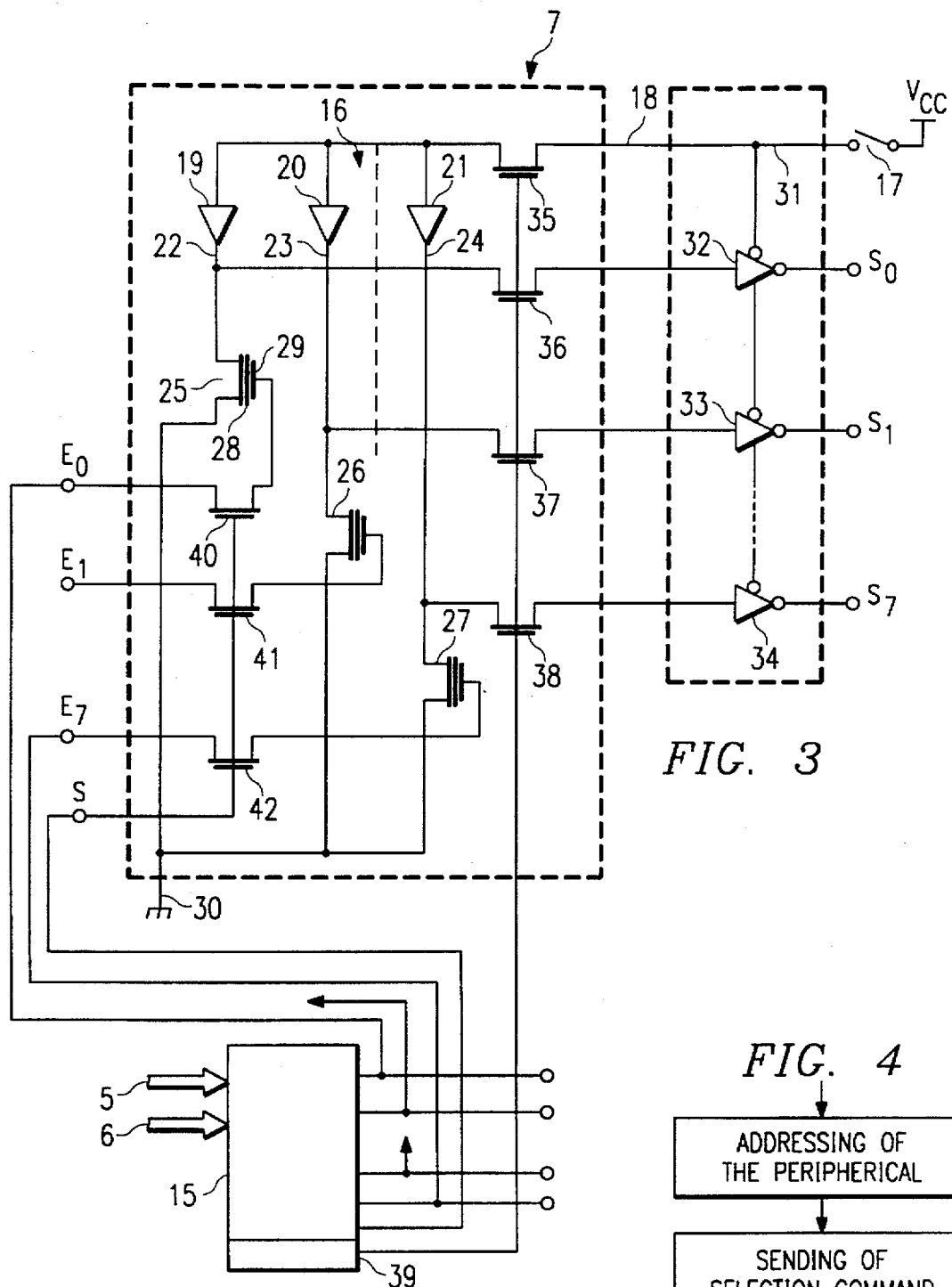
FIG. 3 shows a detailed view of the electronic connection device according to the invention.

FIG. 3 shows a precise view of how the configuration circuit of the invention is made. This configuration circuit 7 has an EEPROM type memory 16. This memory is associated with an automatic starting-up protocol. With this protocol, the contents of the memory are read as soon as the peripheral unit is turned on. At the instant when the peripheral unit is turned on, symbolized herein by the closing of an "on" switch 17, a voltage Vcc is applied to the reading input 18 of the memory 16. Read amplifiers 19 to 21 of this memory are then supplied electrically, and each of them delivers current through a bit line associated with them, 22 to 24 respectively. At each time, an EEPROM-type memory cell such as 25 to 27 is placed in series in these bit lines. This EEPROM-type memory cell has a transistor provided with a floating gate and a control gate. For example, for the transistor 25, the floating gate 28 is interposed between the conduction channel of this transistor and the control gate 29 of this transistor. All the bit lines also are connected, beyond the memory cells 25 to 27, to a link to the ground 30. Initially, it is assumed that no signal is applied to the control gates.

The current then goes into the bit lines 22 to 24 depending on whether the transistors 25 to 27 are on or off. This state of being on or off is dictated by whether or not the electronic charges have been stored beforehand in the floating gates such as 28. The voltage available at the bit lines 22 to 24 is tapped upline of each of the memory cells 25 to 27. When the associated transistor is on, this voltage is null. It shows a logic state 0. When it is off, this voltage is equal to the voltage Vcc: it shows a logic state 1. It is therefore possible to have, at the outputs $S_0$ to $S_7$, these logic states corresponding to the programming states of the memory cells 25 to 27. It will be noted, in passing, that if the address is encoded on eight bits, it is enough to have eight outputs. If it is done on 32 bits, there should be 32 outputs. In any case, the necessary number of memory cells (such as 25 to 27) is limited. It is then possible to manufacture a large number of them on one and the same wafer of integrated circuits during one and the same manufacturing stage.

In one improvement, to prevent the need for reading the memory 16 continuously, a circuit providing access to this memory is used. The circuit described herein is only a circuit given by way of indication to provide a clear understanding of the temporary reading function that it is sought to impose. For, inasmuch as in the invention, the configuration address is read as soon as the peripheral unit is put into operation by the switch 17, it may appear to be necessary to avoid carrying out this reading operation permanently, so as to comply with the EEPROM technology. If a current were to flow permanently in the conduction channels of the transistors such as 25 to 27, the result thereof could be a spontaneous self-programming or de-programming of these cells.

To prevent this situation, the outputs of the configuration circuit 16 are connected to a circuit 31 comprising flip-flops such as 32 to 34. These flip-flop circuits are, for example, RS type flip-flop circuits. At the output of the flip-flop circuit 31, there are logic states available, produced by the memory cells 25 to 27. To stop the reading, and hence the passage of current through the memory cells 25 to 27, a set of passage transistors such as 35 to 38 is interposed in series with the outputs of the configuration circuit 16 and with the input for the application of the Vcc supply potential. The control gates of these transistors then receive a signal produced by a monostable circuit 39. The circuit 39 is integrated into the integrated circuit. This monostable circuit 39 is used only to apply a signal to turn the transistors 35 to 38 off when a certain period has been exceeded, for example when a one-minute period has been exceeded. The inputs of the flip-flops 32 to 34 are then unconnected: these flip-flops nevertheless remain in the state in which they were. The outputs continue to deliver the expected signals $S_0$ to $S_7$.

Figure 4:
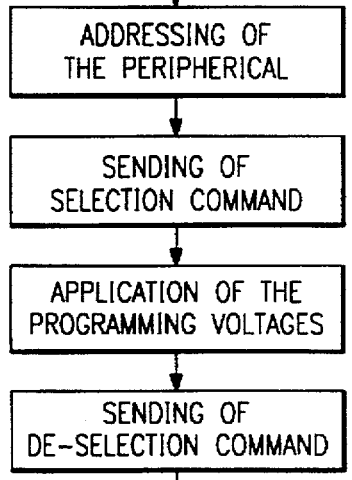
FIG. 4 is a flow chart showing how it is possible to change the address for access to the peripheral unit into which the connection device of the invention is fitted.

It may be necessary to change the address of a peripheral unit. To this end, buses 5 and 6 are used to send a series of signals corresponding to the flow chart summarized in FIG. 4. Initially, the peripheral unit 2 is addressed. In other words, the address conveyed by the address bus is the one currently corresponding to this peripheral unit. Under these conditions, this address signal conforms to the signals delivered by the outputs $S_0$ to $S_7$ of the configuration circuit 7. The validation circuit 14 therefore sends a validation command permitting the operation of the circuit 15 for the management of the unit 2.

After this peripheral unit has been addressed, a so-called selection command S is sent on the data bus 6. This selection command is a special command, hitherto unknown in the normal operation of the peripheral unit 2. This command is designed solely to make the memory circuit 16 work in programming mode. To this end, the selection command S is transmitted to the control gates 40 to 42 of selection transistors placed in series between the control gates such as 29 of the memory cells 25 to 27 respectively and the programming inputs $E_0$ to $E_7$ of the memorizing circuit 16. It being known that the transistors 35 to 38 are now off, the following situation is then obtained. The memory cells 25 to 27 have one input connected to the ground 30, the other one disconnected and their control gate receiving the signals $E_0$ to $E_7$. These signals $E_0$ to $E_7$ are given by the microprocessor 15 which controls the working of the peripheral unit 2. Thus, after the selection order S has been sent, the microprocessor 15 is used to apply programming voltages to these inputs $E_0$ to $E_7$. Thus, the storage or de-storage of the electronic charges at the floating gates such as 28 of the memory cells is brought about. When this programming is over, the selection is made to stop by having the transistors 40 to 42 turned off.

In other words, the programming of the memory 16 is very simple. It includes a first instruction consisting in the addressing of the peripheral unit according to its former address, a second instruction concerning a mode of selection of the programming of the access address memory and finally a third instruction designed to apply adequate programming potentials to the control gates of the transistors of the memory cells of this memory.

The programming function, with the supply of the high programming voltages necessary, may devolve on the microprocessor 15 which handles the peripheral unit 2. In one improvement, however, the supply of these high voltages, of the order of three to four times Vcc, may be done by the memory circuit 16 itself. In this case, it is enough to place voltage amplifiers within this circuit, between the inputs $E_0$ and the corresponding selection transistors. These amplifiers do not have to deliver current since the control gates 29 of the MOS type transistors constituting the memory cells 25 consume no current. These amplifiers may be made in the form of SCHENKEL type multipliers or else in the form of charge pumps. In the latter case, the circuit 16 should include another input to receive a clock signal produced by the microprocessor 15. These amplifiers may be permanently supplied by the supply Vcc.

What is claimed is:

1. An electronic connection device to connect a peripheral unit, which includes a microprocessor, through a bus to a central processing unit, said device comprising an EEPROM-type memory, incorporated in said peripheral unit, memorizing a logic state which defines an access address of said peripheral unit;

said EEPROM-type memory being connected to receive said logic state from the microprocessor of said peripheral unit, wherein said EEPROM-type memory is connected to an automatic starting-up circuit which is configured to read the logic state of said EEPROM-type memory as soon as power is applied to said peripheral unit, and wherein the device includes a writing selection circuit for the selection, in writing mode, of said EEPROM-type memory, said writing selection circuit being addressable by said central processing unit through said bus; said writing mode being controlled by said microprocessor of said peripheral unit.

2. A device according to claim 1, wherein said writing selection circuit is controlled by a circuit which manages said peripheral unit.

3. A method for connecting a peripheral unit through a bus to a central processing unit, said method comprising the steps of:

utilizing a plurality of non-volatile memory cells, incorporated in said peripheral unit, to electronically memorize a logic state corresponding to an access address of said peripheral unit, reading the logic state of said plurality of non-volatile memory cells, whenever power is applied to said peripheral unit after a power-down condition, and writing the value of said logic state to corresponding volatile memory cells, transmitting an address from said central processing unit to a validation circuit in said peripheral unit, comparing the value of said logic state in said set of volatile memory cells with said address transmitted to said validation circuit from said central processing unit and producing a validation signal when the logic state memorized in said volatile memory cells is configured in the same way as said address, and providing access from the central processing unit to said peripheral unit through said bus upon the occurrence of said validation signal.

4. A method in accordance with claim 3, further comprising the step of selecting, in a writing mode, said plurality of memory cells to program said plurality of memory cells.

5. A method in accordance with claim 3, further comprising reading the value of said logic state from said plurality of non-volatile memory cells as soon as a voltage is turned on in said peripheral unit.

6. A method in accordance with claim 3, wherein each of said non-volatile memory cells is an EEPROM-type memory cell comprising a memory transistor having a conduction channel, a control gate, and a floating gate interposed between said control gate and said conduction channel of the respective memory transistor.

7. A method in accordance with claim 6, further comprising reading said logic state from said plurality of non-volatile memory cells as soon as a voltage is turned on in said peripheral unit.

8. A method in accordance with claim 7 further comprising the subsequent step of storing the logic state of said non-volatile memory cells into volatile memory, and then discontinuing the step of reading the logic state of said plurality of non-volatile memory cells.

9. A method in accordance with claim 7 further comprising the subsequent step of storing said logic state of said non-volatile memory cells into volatile memory, and then discontinuing the step of reading said logic state of said plurality of non-volatile memory cells storing said logic state, and then discontinuing the step of reading said logic state in response to the expiration of a time period.

10. A method for connecting a peripheral unit through a bus to a central processing unit, said method comprising the steps of:

utilizing a plurality of non-volatile memory cells, incorporated in said peripheral unit, to electronically memorize a logic state corresponding to an access address of said peripheral unit, reading the value of said logic state of said plurality of non-volatile memory cells, whenever power is applied to said peripheral unit after a power-down condition, and writing the value of said logic state to corresponding volatile memory cells, receiving addresses from a central processing unit in a validation circuit in said peripheral unit, comparing said logic state in said set of volatile memory cells with an address transmitted to said validation circuit from said central processing unit and producing a validation signal when said logic state memorized in said volatile memory cells is configured in the same way as said address, and reprogramming said non-volatile memory cells, under control of a microprocessor in said peripheral unit which is connected to receive data from the bus, only when said microprocessor receives a command from the central processing unit to perform reprogramming.

11. A method in accordance with claim 10, wherein each of said non-volatile memory cells is an EEPROM-type memory cell comprising a memory transistor having a conduction channel, a control gate, and a floating gate interposed between said control gate and said conduction channel of the respective memory transistor.

12. A method in accordance with claim 10, further comprising reading the logic state of said plurality of non-volatile memory cells as soon as power is applied to said peripheral unit.

13. A method in accordance with claim 10, further comprising the subsequent step of discontinuing the step of reading the value of the logic state in response to the expiration of a time period.

* * * * *